US009858166B1

(12) United States Patent
Gong

(10) Patent No.: US 9,858,166 B1
(45) Date of Patent: Jan. 2, 2018

(54) METHODS, SYSTEMS, AND COMPUTER READABLE MEDIUMS FOR OPTIMIZING THE DEPLOYMENT OF APPLICATION WORKLOADS IN A CONVERGED INFRASTRUCTURE NETWORK ENVIRONMENT

(71) Applicant: VCE Company, LLC, Richardson, TX (US)

(72) Inventor: Changbin Gong, Sherborn, MA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 530 days.

(21) Appl. No.: 14/468,767

(22) Filed: Aug. 26, 2014

(51) Int. Cl.
*G06F 17/30* (2006.01)
*G06F 11/34* (2006.01)
*H04L 29/08* (2006.01)
*G06F 9/45* (2006.01)

(52) U.S. Cl.
CPC .......... *G06F 11/3447* (2013.01); *G06F 8/443* (2013.01); *G06F 17/30595* (2013.01); *H04L 67/10* (2013.01)

(58) Field of Classification Search
CPC ............... G06F 17/30595; G06F 8/443; G06F 11/3447; H04L 67/10
USPC ........................................................ 707/748
See application file for complete search history.

(56) References Cited

U.S. PATENT DOCUMENTS

| | | | | |
|---|---|---|---|---|
| 9,489,630 B2* | 11/2016 | Achin | ...................... | G06N 5/02 706/46 |
| 2005/0132323 A1* | 6/2005 | Huerta | ..................... | G06F 8/20 717/100 |
| 2005/0288031 A1* | 12/2005 | Davis | ................... | H04W 40/06 455/452.1 |
| 2009/0259664 A1* | 10/2009 | Murthy | .................. | G06Q 30/02 707/E17.009 |
| 2012/0185867 A1* | 7/2012 | Archer | .................. | G06F 9/5066 718/105 |
| 2013/0061238 A1* | 3/2013 | Archer | .................. | G06F 9/5066 718/105 |
| 2015/0339572 A1* | 11/2015 | Achin | ...................... | G06N 5/02 706/46 |
| 2016/0009425 A1* | 1/2016 | Thompson | ........... | B64G 1/1085 244/158.5 |

* cited by examiner

*Primary Examiner* — Phong H Nguyen
(74) *Attorney, Agent, or Firm* — Jenkins, Wilson, Taylor & Hunt, P.A.

(57) ABSTRACT

Methods, systems, and computer readable mediums for determining a system performance indicator representative of the overall operation of a network system are disclosed. According to one example, a method includes receiving an application workload for deployment into a network environment including a plurality of converged infrastructures and determining an overall deployment optimization score for each of the plurality of converged infrastructures. The method further includes determining a component optimization score for each of a plurality of compute components in a converged infrastructure belonging to the plurality of converged infrastructures that is associated with the highest overall deployment optimization score and deploying the application workload to a compute component belonging to the plurality of compute components that is associated with the highest component optimization score.

20 Claims, 3 Drawing Sheets

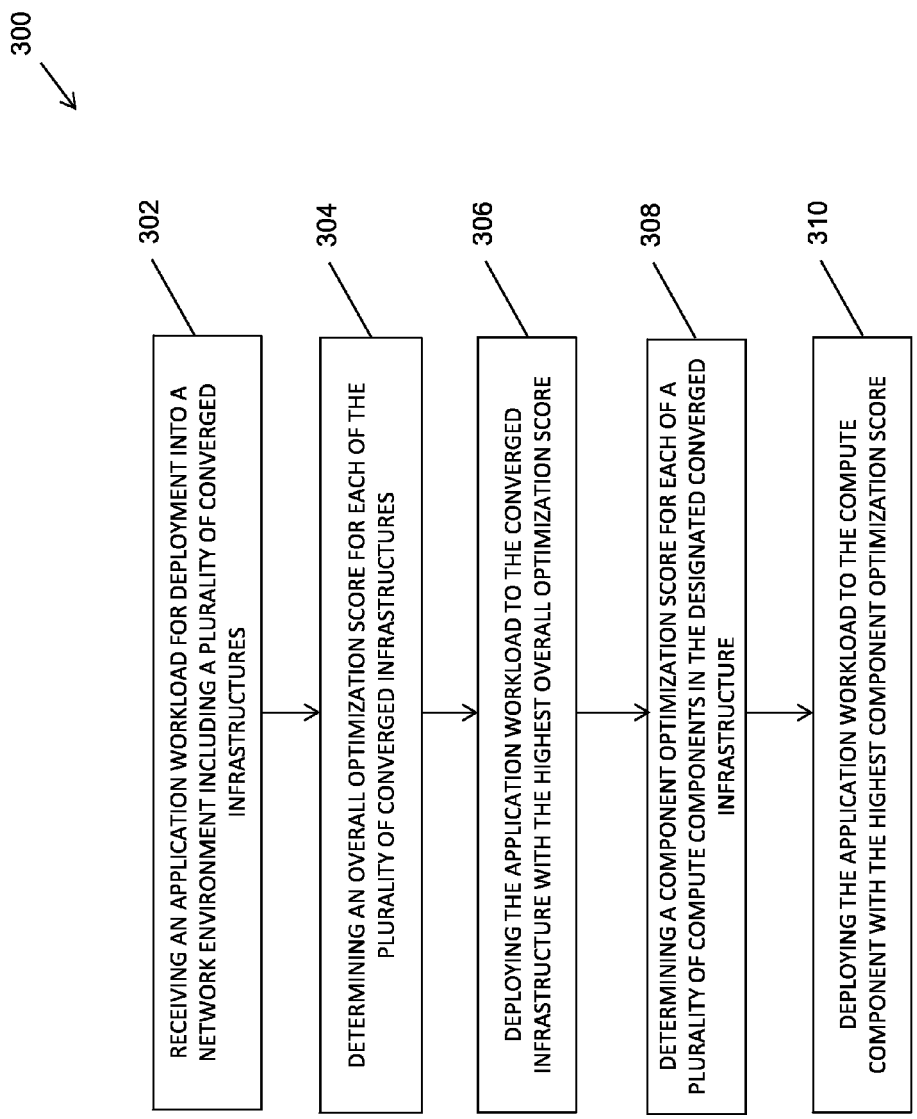

US 9,858,166 B1

METHODS, SYSTEMS, AND COMPUTER READABLE MEDIUMS FOR OPTIMIZING THE DEPLOYMENT OF APPLICATION WORKLOADS IN A CONVERGED INFRASTRUCTURE NETWORK ENVIRONMENT

TECHNICAL FIELD

The subject matter described herein relates to the monitoring and deployment of application workloads in a computer network system. More specifically, the subject matter relates to methods, systems, and computer readable mediums for optimizing the deployment of application workloads in a converged infrastructure network environment.

BACKGROUND

Performance management aimed to create an optimum end-user experience within a network space that includes converged infrastructure systems is presently a challenging undertaking. Every component or element utilized in a converged infrastructure can affect the overall performance of the system and the end-user experience to varying degrees. Similarly, current methods for optimally deploying application workloads (e.g., a virtual machine or a software application) on network environments have produced inefficient and unsatisfactory results. Specifically, complexities can arise when application workload deployments are performed in a cloud computing environment due to the lack of visibility of the underlying physical network infrastructure. For example, some network administrators depend entirely on performance metrics that are based on the abstraction elements existing in a virtualization layer (e.g., a hypervisor) as a guide to deploy application workloads in a network environment. Notably, such measures fail to consider other metrics associated with the compute components that are utilized in the actual physical infrastructure of the network environment.

SUMMARY

Methods, systems, and computer readable mediums for optimizing the deployment of application workloads in a converged infrastructure network environment are disclosed. According to one embodiment, a method includes According to one example, a method includes receiving an application workload for deployment into a network environment including a plurality of converged infrastructures and determining an overall deployment optimization score for each of the plurality of converged infrastructures. The method further includes determining a component optimization score for each of a plurality of compute components in a converged infrastructure belonging to the plurality of converged infrastructures that is associated with the highest overall deployment optimization score and deploying the application workload to a compute component belonging to the plurality of compute components that is associated with the highest component optimization score.

BRIEF DESCRIPTION OF THE DRAWINGS

The subject matter described herein will now be explained with reference to the accompanying drawings of which:

FIG. 3 illustrates a flow chart of an exemplary process for optimizing the deployment of application workloads in a converged infrastructure network environment in accordance with embodiments of the subject matter described herein.

DETAILED DESCRIPTION

The subject matter described herein discloses methods, systems, and computer readable mediums for optimizing the deployment of application workloads in a converged infrastructure (CI) network environment. In some embodiments, the disclosed subject matter utilizes metric data corresponding to individual CIs and associated infrastructure elements to determine an ideal destination for deploying an application workload in a computer network environment. For example, after receiving the metric data from a CI and/or its infrastructure elements, a deployment optimization module hosted by a workload deployment server may be configured to compute optimization scores at a CI level and a compute component level. In some embodiments, the deployment optimization module may be configured to apply the metric data to a weight-based algorithm in order to identify an ideal compute component on a CI that is selected as an optimal host destination.

In some embodiments, the disclosed subject matter can be utilized within a network system that is distributed among a plurality of discrete network segments (e.g., a single computer network system location or geographically separated computer network system) including any type of integrated infrastructure system and/or device, such as a converged infrastructure (CI). Although the following disclosure describes the use of one or more CIs, any integrated infrastructure device may be utilized without departing from the scope of the present subject matter. As used herein, a CI, such as a Vblock™ System from VCE Company, LLC, can comprise multiple converged infrastructure components in a preconfigured, pretested, and/or prepackaged computing platform that may be customized to the requirements of a user. For example, a CI can include a single computing platform unit associated with racks of physical CI components and related software for performing virtualization and/or other information technology (IT) functions. In some embodiments, each CI component associated with a CI can comprise a compute component, a software component, a networking component, a hardware component, or a firmware component. For example, a CI can comprise data storage devices, compute devices (e.g., a unified computing system device), networking equipment (e.g., switch devices), and software for managing physical resources and/or virtualized resources (e.g., virtual servers). In some embodiments, both the distributed network system and CI architecture may be utilized jointly together without departing from the scope of the disclosed subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
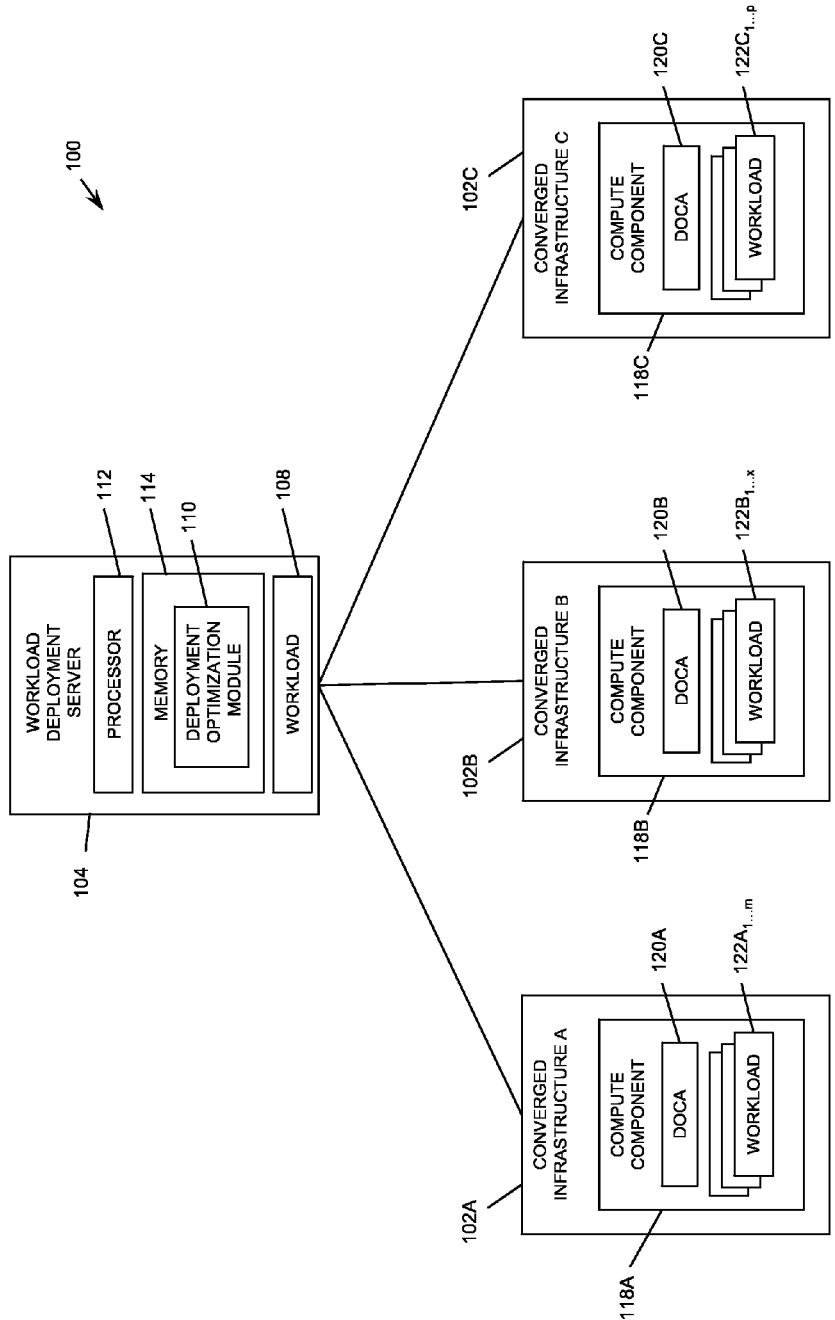
FIG. 1 illustrates an exemplary network system for optimizing the deployment of application workloads in a converged infrastructure network environment in accordance with embodiments of the subject matter described herein.

FIG. 1 is a block diagram illustrating an exemplary network system, generally designated 100, according to an embodiment of the subject matter described herein. Network system 100 includes a plurality of converged infrastructures (CIs) 102A-C and a workload deployment server 104. In some embodiments, CIs 102A-C may be collectively utilized to host and support the execution of one or more workloads. As used herein, an application workload may include an entire software application program or any portion thereof that utilizes a plurality of processes (e.g., subprograms, workload services, software algorithms, etc.) to perform an activity or service that may be useful to a user. Exemplary application workloads include, but are not limited to, an electronic mail service application, a web-based banking application, a multimedia streaming application, and the like. In some embodiments, the application workload may comprise a virtual machine executing the aforementioned software application. Although FIG. 1 only depicts three CIs 102A-C, network system 100 may include and/or utilize additional CIs without departing from the scope of the disclosed subject matter.

In some embodiments, each CI 102 may include at least one compute component 118. As described below with regard to FIG. 2, CI 102 may be provisioned with a plurality of compute components 224-226. Although not shown, each compute component 118 may include at least one processor and at least one memory. For example, each of compute components 118A-C may include a microprocessor (e.g., a trusted platform module (TPM) using trusted execution technology (TXT)), a central processing unit (CPU), or any other like hardware based processor unit. Likewise, memory in compute components 118A-C may include random access memory (RAM), read only memory (ROM), optical read/write memory, cache memory, magnetic read/write memory, flash memory, or any other non-transitory computer readable storage medium. In some embodiments, each of compute components 118A-C may respectively include and/or support a deployment optimization client application (DOCA) 120 and a plurality of application workloads 122. For example, one or more of application workloads $122A_{1 \ldots m}$ may be associated with a particular application or virtual machine that is supported and/or executed by converged infrastructure 102A.

As indicated above, network system 100 may further include an application workload deployment server 104 that is communicatively connected to CIs 102A-C. Notably, workload deployment server 104 may be configured to receive metric data associated with CIs 102A-C from each of CIs 102A-C. In some embodiments, CIs 102A-C may be communicatively linked to application workload deployment server 104 via a direct connection, a wireless connection, and/or through a communications network, such as the Internet (not shown). As shown in FIG. 1, application workload deployment server 104 may include an application workload 108, a deployment optimization module 110, at least one processor 112, and at least one memory 114. In some embodiments, processor 112 that may comprise a microprocessor, a CPU, or any other like hardware based processor unit. Likewise, memory 114 that may comprise RAM, ROM, optical read/write memory, cache memory, magnetic read/write memory, flash memory, or any other non-transitory computer readable medium. Notably, processor 112 and memory 114 may be used to execute and manage deployment optimization module 110 (see details below). In some embodiments, application workload deployment server 104 may also include a user interface module (not shown) that may support a user interface that can be utilized by a system administrator to load an application workload into network system 100. In some embodiments, application workload deployment server 104 may be embodied as a CI that includes a plurality of compute components. Notably, each of the compute components in the CI includes its own processor(s) and memory that may be utilized to execute at least a portion of deployment optimization module 110. In one embodiment, application workload deployment server 104 may be configured with an advanced management pod (AMP) that, similar to a compute component, includes its one processor(s) and memory that are configured to manage and execute deployment optimization module 110.

In some embodiments, deployment optimization module 110 may include a software module that implements an algorithm configured to consolidate metric data obtained from CIs 102A-C in real time in order to generate a deployment optimization score based on the locality, health, capacity and compliance grade of each CI 102 in network system 100. To accomplish this functionality, deployment optimization module 110 may be configured (e.g., preconfigured by a system administrator) to communicate with the deployment optimization client application 120 on each of CIs 102A-C in the network environment. After establishing communications with deployment optimization client application 120, deployment optimization module 110 may request relevant metric data associated with each of CIs 102A-C. Notably, the metric data requested from each of CIs 102A-C may include data related to the geographical locality of the CI, data related to the overall health of the CI, data related to the overall capacity of the CI, and/or data related to the overall infrastructure compliance exhibited the CI. For example, the locality data may include any information that indicates the physical and/or geographical location of the CI. In some embodiments, locality data may be recorded and stored by a management module in the CI, such as CI manager module 202 (e.g., as described below in FIG. 2). The use of locality information may be useful to identify CIs that are compliant with an application workload's locality requirements (e.g., in order to ensure prospective CI host is in a policy-compliant location per state and/or national regulations). In some embodiments, the locality requirements may comprise geographical restrictions that are established by metadata (or any other type of data) contained in the application workload.

Similarly, the health metric data may include any information that indicates the effective utilization or performance of the CI. For example, the health metric data may be information that indicates erratic behavior, system errors (e.g., initialization errors, processing errors, storage errors, etc.), or any other factor signifying the CI's inability to utilize its resources at or around an acceptable performance threshold level. Likewise, capacity metric data may include any information pertaining to respective capacities of the CI's compute components (e.g., processor and memory usage), storage components (e.g., disk space and use), and network components (e.g., network bandwidth and throughput).

Moreover, the compliance metric data may include any data that indicates the level of interoperability among the components of the CI. For example, compliance metric data may indicate whether different versions and different models of component hardware and software included in a CI are up-to-date. Similarly, the compliance metric data may include information indicating the degree of compatibility among the specific versions and models of the components included in the CI. In addition, the compliance metric data may also include an indication of the CI's compliance to underlying security measures.

As indicated above, each of CIs 102A-C may respectively utilize a deployment optimization client application 120 to monitor and acquire the CI metric data. The manner in which deployment optimization client application 120 obtains the metric data for CI 102 is described below in the description of FIG. 2. After collecting the relevant metric data, deployment optimization client application 120 in CI 102 forwards the obtained metric data to deployment optimization module 110 in workload deployment server 104. More specifically, workload deployment server 104 respectively receives metric data from each of CIs 102A-C for further processing.

Upon receiving the metric data from each of CIs 102A-C, workload deployment server 104 may execute deployment optimization module 110 to initiate the determination of a deployment optimization score associated with each CI. In some embodiments, deployment optimization module 110 may be configured to assign a numerical grade (e.g., 0 to 100) to each of the different metric data categories (e.g., locality, health, capacity, and compliance metric data categories) received from a CI 102. For example, deployment optimization module 110 may analyze the received location information and assign a grade of 100 to the locality metric data category if the location information complies with an established locality regulation (e.g., indicated via geographic restriction data included in the application workload). Alternatively, deployment optimization module 110 may assign a numerical grade of 0 to the locality metric data category if the received location information fails to comply with the locality regulation. In some embodiments, a CI determined to be located in an area that fails to comply with a locality regulation is eliminated from further consideration by deployment optimization module 110.

In some embodiments, deployment optimization module 110 may assign an appropriate numerical grade (e.g., 85) to the health metric data category based upon the performance levels indicated in the received health metric data. Similarly, deployment optimization module 110 may also assign appropriate numerical grades to each of the capacity metric data category (e.g., 75) and the compliance metric data category (e.g., 90) based upon the capacity levels and the compliance levels indicated in the received capacity metric data and the received compliance metric data, respectively. After assigning grades to each of the four metric data categories, deployment optimization module 110 may be configured to generate an overall deployment optimization score by subsequently designating weights to each of the assigned grades. In one embodiment, the numeric grades associated with the locality information, the health metric data, the capacity metric data, and the compliance metric data categories may respectively be assigned with predefined weighted values, such as 40%, 30%, 20%, and 10%. In such an embodiment, the overall deployment optimization score for the CI may equal 89.5 (e.g., [100·40%+ 85·30%+75·20%+90·10%=89.5]). Notably, deployment optimization module 110 can be configured to perform the overall deployment optimization score calculation for each of each of CIs 102A-C.

After performing the optimization score calculations for CIs 102A-C, deployment optimization module 110 may be configured to compare all of the computed overall deployment optimization scores with each other in order to designate the CI associated with the highest overall deployment optimization score as the deployment destination for the application workload. Alternatively, deployment optimization module 110 may present the determined overall deployment optimization scores to a user (e.g., via a GUI). For example, deployment optimization module 110 may be configured present all of the overall deployment optimization scores on a computer screen display, a mobile device screen, a control room display, or any other user interface and/or display that is used by an operator or administrator of network system 100. In such an embodiment, the user may select a CI or confirm the deployment optimization module's selection of the CI associated with the highest overall deployment optimization score as the deployment destination for the application workload. In some embodiments, once the CI is selected, deployment optimization module 110 may also be configured to utilize the received metric data to compute a component optimization score for each of the compute components (e.g., computer servers, blades, etc.) on the designated CI in the same manner described above. Alternatively, deployment optimization module 110 may be configured to request component specific metric data from the deployment optimization client application 120 on the selected CI in order to compute a component optimization score for each of the CI's compute components. Using the methodology described above with respect to the calculation of an overall deployment optimization score, deployment optimization module 110 may be configured to select a compute component associated with a highest overall component optimization score as the deployment component destination for the application workload.

It will be appreciated that FIG. 1 illustrates an exemplary embodiment and that various nodes, their locations, and/or their functions as described above in relation to FIG. 1 may be changed, altered, added, or removed. It should be noted that in some embodiments, deployment optimization module 110 in FIG. 1 and/or functionality described herein may constitute a special purpose deployment optimization system and/or device. Further, deployment optimization module 110 and/or functionality described herein can improve the technological field of cloud computing application deployment by affording improvements related to computer network resource management, strategic application deployment, and load-balancing administration.

Figure 2:
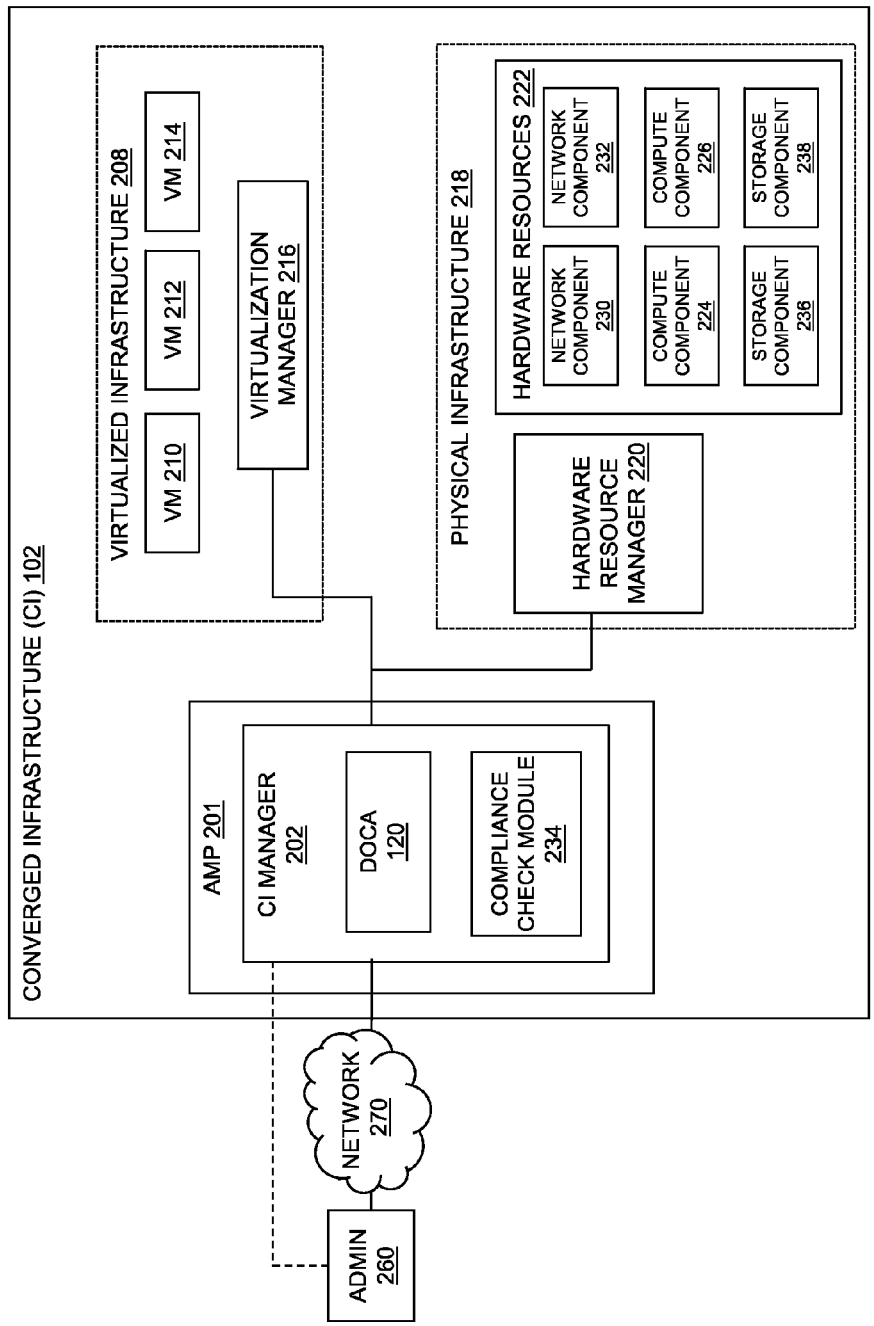
FIG. 2 illustrates an exemplary converged infrastructure for optimizing the deployment of application workloads in a converged infrastructure network environment in accordance with embodiments of the subject matter described herein.

As indicated above, the disclosed subject matter can be utilized in a converged infrastructure system. FIG. 2 is a diagram illustrating a logical representation of an exemplary CI 102 (similar to each of CIs 102A-C depicted in FIG. 1) according to an embodiment of the subject matter described herein. In some embodiments, CI 102 can comprise a plurality of infrastructure elements, including one or more physical resources and one or more virtual resources. Exemplary physical resources can comprise a processor, a compute device, network equipment, a router, a switch, wiring or cabling, a storage device, a physical port, and/or a communications interface. Exemplary virtual resources can comprise a virtual entity (e.g., an entity that appears as a physical entity but comprises one or more CI components associated with one or more CIs), a virtual machine, a virtual server, a virtual storage device, a virtual port, and/or a virtual communications interface. As indicated above, CI 102 includes an AMP 201, which may comprise a self-contained management infrastructure component or device configured to perform management and monitoring functions for the CI platform. In some embodiments, AMP 201 may be configured to host CI manager 202, deployment optimization client application 120, and compliance check module 234. AMP 201 may be further configured to include at least one hardware processor and memory that may be utilized to perform a number of functions, such as hosting the CI management software (e.g., CI manager 202), hosting update managers, and executing both compliance check module 234 and deployment optimization client application 120 in the manner described below. CI 102 may also further comprise other software and related CI components used for managing the CI and/or portions therein. In some embodiments, AMP 201 may be deployed as one or more rack mounted servers that include one or more processors and memory (e.g., similar to and/or incorporated within at least one of compute components 224-226). In some embodiments, AMP 201 may be embodied as a dedicated and/or specialized compute component configured for performing the management and monitoring functions of CI 102.

In some embodiments, CI 102 can be configured to provide data storage functionality, cloud service functionality, and/or other IT functionality which can support a vast number of software application workloads. CI 102 can also be configured to communicate with various other entities, such as other CIs, network nodes, and users. For example, user 260 (e.g., a human administrator/operator or an automated system) may use an application programming interface (API), a command line interface, or web-based graphical user interface to login to CI 102 to access CI manager 202. In some embodiments, user 260 may establish communication directly with CI 100 without use of network 270.

In some embodiments, CI 102 can comprise a CI manager 202 (e.g., a CI management module), a virtualized infrastructure 208, and/or a physical infrastructure 218. CI manager 202 may be any suitable entity for managing the operation of CI 102 and may be configured to communicate with various CI components, such as virtual resources, physical resources, and/or software for managing various CI components. For example, CI manager 202 may be configured to manage performance, resource utilization levels, and other aspects associated with virtualized infrastructure 208 and/or physical infrastructure 218. In some embodiments, CI manager 202 comprises VCE Vision™ Intelligent Operations software and/or firmware that may be executed by a processor within AMP 201 or any other processing unit present in CI 102 (e.g., a processor on a compute component). In some embodiments, CI manager 202 may also include a deployment optimization client application 120 and a compliance check module 234, which are both described in additional detail below.

In some embodiments, virtualized infrastructure 208 can comprise a virtualization environment configured to simulate components of a computing device, e.g., a processor, system memory, and a storage device, for executing one or more virtual machines (VMs). For example, each of VM 210, VM 212, and VM 214 may be configured to perform various functions and/or services, such as web server functions or cloud application services, and may interact with various nodes, components, and/or users.

In some embodiments, virtualized infrastructure 208 may be associated with one or more virtual entities. Each virtual entity can comprise one or more CI or portions therein, such as infrastructure elements from one or more CIs. In some embodiments, virtualization manager 216 may allow logical entities to be created, deleted, or modified using an API, a GUI, or a CLI. Virtualization manager 216 may be any suitable entity (e.g., software executing in a virtual machine) for managing aspects associated with virtualized infrastructure 208. In some embodiments, virtualization manager 216 may be configured to provide management functionality through one or more communications interfaces. For example, virtualization manager 216 may communicate with deployment optimization client application 120 using one or more APIs. In some embodiments, virtualization manager 216 may obtain metric data from each of virtual machines 210-214 prior to forwarding the acquired metric data to deployment optimization client application 120.

Physical infrastructure 218 can comprise hardware resources 222, such as network components 230-232, compute components 224-226 (sometimes referred to as "hosts", compute devices, and/or compute servers), and storage components 236-238, each of which may comprise a storage area network (SAN). In some embodiments, one or more file share storage (FSS) systems (not shown) can be utilized to provide file system level access to a CI across a local area network (LAN). Hardware resources 222 may be communicatively connected to various other components in CI 102 and other entities. Hardware resources 222 can be configured to be used by one or more virtual entities. In some embodiments, network components 230-232 (e.g., network switches) may be configured to enable communication between the resources within the CI. For example, compute component 224 and storage component 236 may be used in implementing VM 210 and VM 212 and compute server 226 and storage component 238 may be used in implementing VM 214 and virtualization manager 216.

In some embodiments, compute components 224-226 can include a hypervisor that may be configured to function as a host operating system and/or a virtual machine that runs as one or more guest application (e.g., operating system) within the hypervisor. As used herein, the term "hypervisor" can refer to computer software, firmware and/or hardware that is responsible for creating, hosting and managing guest virtual machines running on a host machine. In some embodiments, a hypervisor can be configured to function as a host operating system configured to host one or more guest operating systems. Notably, each guest operating system can function within the hypervisor as a virtual machine and provide a platform to various application workload services and/or applications. As previously indicated, compute components 224-226 can be configured to implement virtual machines 210-214. Specifically, virtual machines 210-214 can be configured to host virtual entities including a virtual machine, a virtual server, a virtual storage device, a virtual port, and/or a virtual communications interface, and can require a virtualization software specific credential.

Hardware resource manager 220 may be any suitable entity (e.g., software executing in a virtual machine) for managing aspects associated with physical infrastructure 218. In some embodiments, hardware resource manager 220 may be configured to provision hardware resources 222 via one or more communications interfaces. For example, hardware resource manager 220 may provision hardware resources 222 in order to implement one or more virtual entities in virtualized infrastructure 208. In some embodiments, hardware resource manager 220 may comprise any management component or entity, such as a unified infrastructure manager (UIM) or a unified computing system (UCS) director entity, which is configured to manage and/or provision the physical hardware of CI 100. In some embodiments, hardware resource manager 220 may be configured to obtain metric data from each of network components 230-232, compute components 224-226, and storage components 236-238 before forwarding all of the collected metric data to deployment optimization client application 120.

In some embodiments, AMP 201 may be configured to host a repository (not shown) that comprises any data storage unit (e.g., a database or plurality of databases) that may be configured to function as a centralized storage unit for the CI components of CI 102. In some embodiments, the repository can also be embodied as a data storage unit located at a public distributed content site, on a local proxy server in a customer's environment, or on a different CI that is accessible by AMP 201 without departing from the scope of the disclosed subject matter. In some embodiments, the repository may be configured to store CI component information (e.g., data indicating which CI components are supporting an application and/or application processes, performance metric data associated with CI components 224, 226, 228, 230, 232, 236, 238, etc.). Likewise, the CI component configuration information stored in the repository may be accessed and obtained by deployment optimization client application 120. In some embodiments, deployment optimization client application 120 may utilize an API interface (e.g., a RESTful API) to communicate with the repository in order to access any stored metric data that has been previously provisioned by hardware resource manager 220 and virtualization manager 216 (via CI manager 202).

In some embodiments, CI manager 202 can comprise or interact with a deployment optimization client application 120. Although FIG. 2 depicts deployment optimization client application 120 as a component of CI manager 202, deployment optimization client application 120 may comprise a stand-alone module or software application. For example, deployment optimization client application 120 can be any suitable entity (e.g., software executing on a processor) for performing one or more aspects associated with collecting processing metric data, communicating with managers 216-218, and communicating with deployment optimization module 110 (as shown in FIG. 1). In some embodiments, deployment optimization client application 120 may be executed via at least one processor and at least one memory module included in AMP 201 or any one of compute component 224-226. For example, deployment optimization client application 120 may be communicatively connected to various resources via a system bus. 120.

In some embodiments, deployment optimization client application 120 can be utilized to request and process metric data received from the CI components in CI 102. For example, deployment optimization client application 120 may be configured to request and receive metric data from each of network components 230-232, compute components 224-226, storage components 236-238, virtual machines 210-214 and/or their respective operating systems (not shown). Deployment optimization client application 120 may further be configured to receive health, performance, and/or capacity metric data from other CI infrastructure elements, such as hypervisors (not shown), load balancers (not shown), and supported applications in CI 102 without departing from the scope of the disclosed subject matter.

In some embodiments, compliance metric data may be obtained by CI manager 202 via a compliance check module 234. In one embodiment, compliance check module 234 may be configured to identify the CI components that require remediation and/or updating in order to comply with a designated CI configuration (e.g., as selected by a system administrator or operator). For example, upon being notified of the designated CI configuration version to be applied to a CI, compliance check module 234 may be configured to compare the revision identifiers of the CI components (e.g., the revision/version number of the associated CI component firmware, BIOS, software, drivers, etc.) associated with the designated CI configuration version to the revision identifiers of the CI components currently utilized by the CI. Notably, the revision identifiers may comprise any number of letters, numbers, and/or symbols. In some embodiments, compliance check module 234 may be configured to provide the compliance metric data to deployment optimization client application 120 for further processing.

After receiving metric data from the CI components and/or the management elements in CI 102, deployment optimization client application 120 may be configured to organize the metric data into a plurality of categories, such as a health metric data category, a capacity metric data category, and a compliance metric data category. Deployment optimization client application 120 may be configured to subsequently forward the metric data (as well as geographical location data) to deployment optimization module 110 upon request. In some embodiments, the metric data provided to deployment optimization module 110 may correspond to the CI overall, or alternatively, to specific CI components only (e.g., compute components, blades, etc.).

As indicated above, the subject matter disclosed herein can be implemented in software in combination with hardware and/or firmware. For example, the subject matter described herein can be implemented in software executed by a processor unit (e.g., a processor included in one or more of compute components 224-226 in FIG. 2). In one exemplary implementation, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, deployment optimization client application 120 may be located at a single computing system or may be distributed across one or more devices, platforms, and/or systems. As used in the present disclosure, the terms "function" or "module" refer to hardware, firmware, or software in combination with hardware and/or firmware for implementing features described herein.

It will be appreciated that FIG. 2 illustrates an exemplary embodiment and that various nodes, their locations, and/or their functions as described above in relation to FIG. 2 may be changed, altered, added, or removed.

FIG. 3 illustrates a flow chart of an exemplary method 300 for optimizing the deployment of application workloads in a converged infrastructure network environment in accordance with embodiments of the subject matter described herein. The following process is also described with respect to system 100 in FIG. 1 and CI 102 in FIG. 2 as an exemplary embodiment.

In step 302, an application workload to be deployed in a network environment including a plurality of CIs is identified. In one example with reference to FIG. 1, a system administrator may wish to introduce an application workload (e.g., a cloud computing application) into a network environment, such as network system 100 that includes CIs 102A-C. In some embodiments, an application workload 108 may originally reside on a workload deployment server 104 prior to being deployed and loaded on a particular CI in the network environment.

In step 304, an overall deployment optimization score for each of the plurality of CIs is determined. In some embodiments, deployment optimization module 110 may be configured to determine an optimal deployment destination for application workload 108. For instance, deployment optimization module 110 may be configured to query deployment optimization client applications 120A-C to obtain metric data associated with each of CIs 102A-C. Upon receiving the query, each of deployment optimization client applications 120A-C may respectively prompt a number of components and/or component managers in CIs 102A-C to provide metric data to workload deployment server 104 and/or deployment optimization module 110. For example, client application 120A may query a hardware resource manager (e.g., hardware resource manager 220 in FIG. 2) to obtain health metric data and capacity metric data of the collective hardware resources (e.g., components 224-232 in FIG. 2) on CI 102A. In some embodiments, client application 120A may also query CI manager 202 to obtain information regarding the CI's geographical location (e.g., physical location information of the CI that may be recorded and maintained by the CI manager). In some embodiments, client application 120A may also query a compliance check module (e.g., compliance check module 234 in FIG. 2) to obtain a compliance grade indicating the CI's overall level of compliance with respect to a specific and/or defined CI configuration version (e.g., such as a Release Certification Matrix (RCM) configuration version for a specific CI unit model). For example, client application 120A may prompt compliance check module 234, which is normally configured to identify the CI components that require remediation and/or updating in order to comply with a designated CI configuration (e.g., as selected by a system administrator or operator), to query hardware resource manager 220 and virtualization manager 216 to obtain metric data associated with virtual machines 210-214 and hardware components 224-232.

After acquiring the metric data (e.g., locality information, health metric data, capacity metric data, and compliance grade) from client application 120A, deployment optimization module 110 in workload deployment server 104 may determine an overall deployment optimization score for each of CIs 102A-C. In some embodiments, workload deployment server 104 may generate an overall deployment optimization score that initially assigns a numeric grade to each of the obtained metric data and subsequently designates weights (e.g., percentile weightings) to the aforementioned assigned grades. For example, the numeric grades associated with the locality information, the health metric data, the capacity metric data, and the compliance grade may respectively be assigned weighted values, such as 40%, 30%, 20%, and 10%. In some embodiments, each metric data category may also require a prerequisite passing grade to be considered for the deployment of the application workload. For example, if the CI does not meet the locality requirements of the application workload, then then the remaining metric data is not considered by deployment optimization module 110.

In step 306, the application workload is deployed to the CI with the highest overall deployment optimization score. For example, after determining the overall deployment optimization score for each of CI 102A, CI 102B and CI 102C, deployment optimization module 110 may compare the calculated optimization scores. In some embodiments, deployment optimization module 110 may then identify the CI associated with the highest (i.e., greatest numerical value) overall deployment optimization score and deploy the application workload on the identified CI. In alternate embodiments, deployment optimization module 110 may identify the CI with the highest overall deployment optimization score but delay and/or withhold the deployment of the application workload until an appropriate compute component in the identified CI is determined (e.g., see steps 308 and 310 below).

In step 308, a component optimization score for each of a plurality of compute components in the designated CI is determined. In some embodiments, deployment optimization module 110 may query the deployment optimization client application 120 in the designated CI (e.g., identified in step 306) in order to obtain metric data corresponding to the CI's resident compute components. For example, if optimization module 110 determined that CI 102A had the highest optimization score in step 306, then optimization module 110 may communicate with deployment optimization client application 120A to request metric data specific to the compute components contained in CI 102A. In some embodiments, deployment optimization client application 120A may communicate with CI manager 202 to obtain health metric data, capacity metric data, and component compliance grade data for each compute component (e.g., compute components 224-226 in FIG. 2). For example, deployment optimization client application 120A may query the hardware resource manager in CI 102A to obtain the health metric data and the capacity data for each of the compute components. Similarly, deployment optimization client application 120A may query the compliance check module 234 in CI manager 202 to acquire component compliance grades for each of the compute components hosted by CI 102A.

After acquiring the component metric data (e.g., the health metric data, the capacity metric data, and the component compliance grade) from client application 120A, deployment optimization module 110 in workload deployment server 104 may determine a component optimization score for each compute component included in CI 102A. In some embodiments, deployment optimization module 110 may generate a component optimization score that initially assigns numeric or percentile grades to each of the obtained metric data categories and subsequently designates weights to the assigned grades. For example, the numeric/percentile grade associated with health metric data, capacity metric data, and a component compliance grade may respectively be assigned weighted values, such as 50%, 30%, and 20%. In some embodiments, each metric data category may also require a prerequisite passing grade to be considered for the deployment of the application workload. For example, if the compute component does not meet a particular health metric data threshold level, then then the remaining metric data (e.g., capacity and component compliance metric data) is not considered by deployment optimization module 110 and the associated compute component is removed from deployment consideration.

In step 310, the application workload is deployed to the compute component with the highest component optimization score. For example, after determining the component optimization score for all of the compute components on CI 102A (i.e., the CI identified in step 306), deployment optimization module 110 may compare the calculated component optimization scores with each other. In some embodiments, deployment optimization module 110 may then identify the compute component on CI 102A associated with the highest (i.e., greatest numerical value) component optimization score and deploy the application workload on the identified compute component.

As indicated above, the subject matter described herein can be implemented in software in combination with hardware and/or firmware. For example, the subject matter described herein can be implemented in software executed by a hardware processor. In one exemplary implementation, the subject matter described herein can be implemented using a computer readable medium having stored thereon computer executable instructions which, when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for optimizing the deployment of application workloads in a converged infrastructure network environment, the method comprising:
   receiving, by a workload deployment server, an application workload for deployment into a network environment including a plurality of converged infrastructures;
   determining, by the workload deployment server, an overall deployment optimization score for each of the plurality of converged infrastructures, wherein determining the overall deployment optimization score includes utilizing performance metric data provided from deployment optimization client applications hosted in the plurality of converged infrastructures to the workload deployment server;
   determining a component optimization score for each of a plurality of compute components in a converged infrastructure belonging to the plurality of converged infrastructures that is associated with the highest overall deployment optimization score; and
   deploying the application workload to a compute component belonging to the plurality of compute components that is associated with the highest component optimization score.

2. The method of claim 1 wherein determining the overall deployment optimization score includes determining whether a physical location of each of the converged infrastructures complies with geographical restrictions established by metadata included in the application workload.

3. The method of claim 2 wherein determining the overall deployment optimization score further includes obtaining health metric data, capacity metric data, and a compliance grade for each of the converged infrastructures.

4. The method of claim 3 comprising utilizing the physical location, the health metric data, the capacity metric data, and the compliance grade associated with each of the converged infrastructures in a weighted algorithm to compute an overall deployment optimization score for each of the converged infrastructures.

5. The method of claim 4 comprising deploying the application workload to the converged infrastructure belonging to the plurality of converged infrastructures that is associated with the highest overall deployment optimization score.

6. The method of claim 1 wherein determining the component optimization score includes determining component health metric data, component capacity metric data, and a component compliance grade for each of the plurality of compute components.

7. The method of claim 6 wherein deploying the application workload on the compute component includes utilizing the component health metric data, the component capacity metric data, and the component compliance grade associated with each of the compute components in a weighted algorithm to compute a component optimization score for each of the compute components.

8. A system for optimizing the deployment of application workloads in a converged infrastructure network environment, the system comprising:
   a plurality of converged infrastructures; and
   a workload deployment server that includes at least one processor, memory, and a deployment optimization module stored in the memory and when executed by the at least one processor is configured to:
     receive an application workload for deployment into a network environment including a plurality of converged infrastructures;
     determine an overall deployment optimization score for each of the plurality of converged infrastructures by utilizing performance metric data provided from deployment optimization client applications hosted in the plurality of converged infrastructures to the workload deployment server;
     determine a component optimization score for each of a plurality of compute components in a converged infrastructure belonging to the plurality of converged infrastructures that is associated with the highest overall deployment optimization score; and
     deploy the application workload to a compute component belonging to the plurality of compute components that is associated with the highest component optimization score.

9. The system of claim 8 wherein determining the overall deployment optimization score includes determining whether a physical location of each of the converged infrastructures complies with geographical restrictions established by metadata included in the application workload.

10. The system of claim 9 wherein determining the overall deployment optimization score further includes obtaining health metric data, capacity metric data, and a compliance grade for each of the converged infrastructures.

11. The system of claim 10 comprising utilizing the physical location, the health metric data, the capacity metric data, and the compliance grade associated with each of the converged infrastructures in a weighted algorithm to compute an overall deployment optimization score for each of the converged infrastructures.

12. The system of claim 11 comprising deploying the application workload to the converged infrastructure belonging to the plurality of converged infrastructures that is associated with the highest overall deployment optimization score.

13. The system of claim 8 wherein determining the component optimization score includes determining component health metric data, component capacity metric data, and a component compliance grade for each of the plurality of compute components.

14. The system of claim 13 wherein deploying the application workload on the compute component includes utilizing the component health metric data, the component capacity metric data, and the component compliance grade associated with each of the compute components in a weighted algorithm to compute a component optimization score for each of the compute components.

15. A non-transitory computer readable medium having stored thereon executable instructions which, when executed by a processor of a computer, cause the computer to perform steps comprising:
receiving an application workload for deployment into a network environment including a plurality of converged infrastructures;
determining an overall deployment optimization score for each of the plurality of converged infrastructures, wherein determining the overall deployment optimization score includes utilizing performance metric data provided from deployment optimization client applications hosted in the plurality of converged infrastructures to a workload deployment server;
determining a component optimization score for each of a plurality of compute components in a converged infrastructure belonging to the plurality of converged infrastructures that is associated with the highest overall deployment optimization score; and
deploying the application workload to a compute component belonging to the plurality of compute components that is associated with the highest component optimization score.

16. The computer readable medium of claim 15 wherein determining the overall deployment optimization score includes determining whether a physical location of each of the converged infrastructures complies with geographical restrictions established by metadata included in the application workload.

17. The computer readable medium of claim 16 wherein determining the overall deployment optimization score further includes obtaining health metric data, capacity metric data, and a compliance grade for each of the converged infrastructures.

18. The computer readable medium of claim 17 comprising utilizing the physical location, the health metric data, the capacity metric data, and the compliance grade associated with each of the converged infrastructures in a weighted algorithm to compute an overall deployment optimization score for each of the converged infrastructures.

19. The computer readable medium of claim 16 wherein determining the component optimization score includes determining component health metric data, component capacity metric data, and a component compliance grade for each of the plurality of compute components.

20. The computer readable medium of claim 19 wherein deploying the application workload on the compute component includes utilizing the component health metric data, the component capacity metric data, and the component compliance grade associated with each of the compute components in a weighted algorithm to compute a component optimization score for each of the compute components.

* * * * *